E. P. Gleason.
Socket Coupling.
No. 3,577. Reissued Aug. 3, 1869.
Fig: 1.
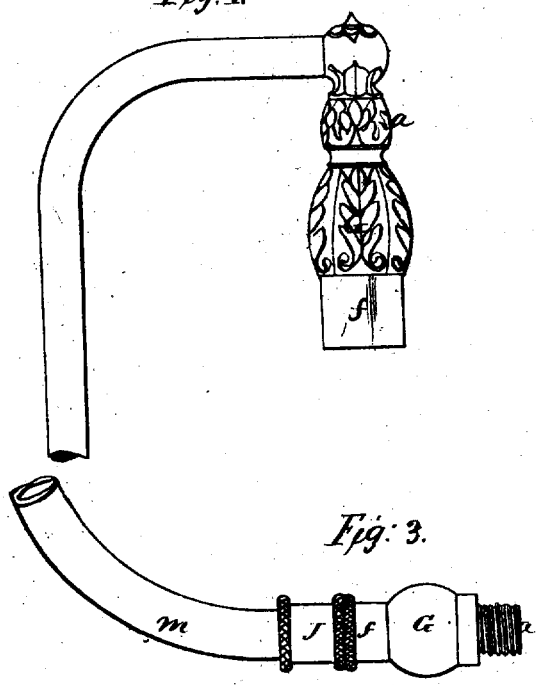
Fig: 2
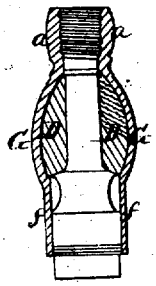
Fig: 7.
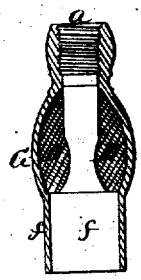
Fig: 8.
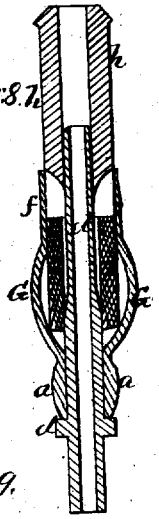
Fig: 9.
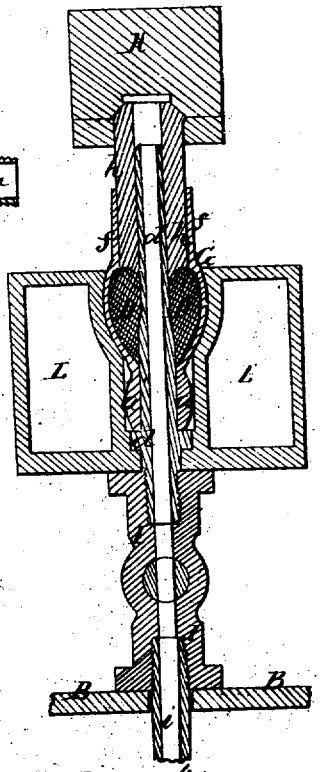
Fig: 4.
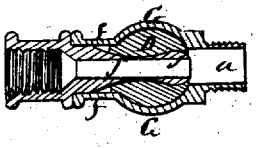
Fig: 5.
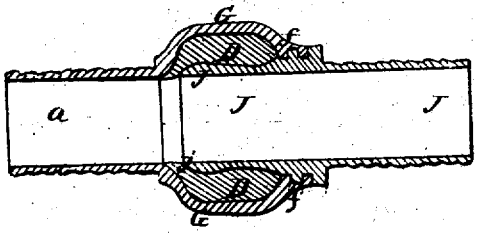
Fig: 6.
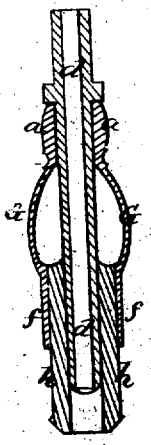
Fig: 10.
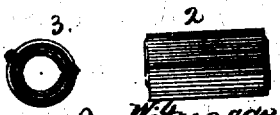
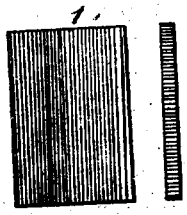
Witnesses:
James H. Parsons
Isaac A. Brunell
Inventor,
E. P. Gleason

United States Patent Office.

ELLIOTT P. GLEASON, OF PROVIDENCE, RHODE ISLAND.

*Letters Patent No.* 30,400, *dated October* 16, 1860; *reissue No.* 3,577, *dated August* 3, 1869.

IMPROVEMENT IN SOCKET-COUPLINGS.

The Schedule referred to in these Letters Patent and making part of the same.

*To all whom it may concern:*

Be it known that I, ELLIOTT P. GLEASON, of Providence, Providence county, and State of Rhode Island, did invent a new and improved Socket-Coupling, which is applicable for the purpose of uniting pipes, or tubes, for the conveyance of gas, or inflexible tubing or engine-hose for the conveyance of water; and I do hereby declare that the following is a full, clear, and exact description of the same, reference being had to the annexed drawings, making a part of this specification, in which—

Figure 1 is a view of an ornamental socket for connecting with gas-burner.

Figure 2 is a transverse section of the same, fixed upon a gas-burner.

Figure 3 is a view of a coupling attached to a flexible tube, for connecting with a portable gas-standard or burner.

Figure 4 is a transverse section of the same.

Figure 5 is a transverse section of a hose-coupling for the conveyance of water.

Figure 6 is a transverse section of the socket-shell, with the mandrel and plunger used in filling the same.

Figure 7 is a transverse section of the socket.

Figure 8 is a transverse section of the shell, with the mandrel and plunger, containing a cylinder of caoutchouc about to be acted upon.

Figure 9 is a transverse section of the socket within the apparatus used for heating the gum.

Figure 10 represents the gum cut from the sheet and formed into a cylinder.

Similar letters of reference denote like parts in the different figures.

The nature of the present invention consists in constructing a socket with a recess fitted with an elastic packing, as more fully hereinafter set forth; in forming, within a metallic shell, a hollow cylindrical cushion of caoutchouc, or other like elastic gum, by means of heat applied within directly to the gum, and to the shell without, whereby the gum is moulded to a desirable form, and "vulcanized" upon the inner surface of the said cushion, and made to adhere firmly to the inner walls of the shell, for the purpose of forming an air-tight joint, with a metallic pipe, tube, or socket-piece inserted within said hollow cushion, and applied for conveying gas, water, &c.

To enable others skilled in the art to make use of my invention, I will proceed to describe the same with reference to the drawings.

I construct the shell of the socket or coupling G of brass or iron, cast in one piece, having an oval or globular swelling of sufficient capacity to receive or contain a proper quantity of gum to render the cushion elastic, and terminating in a contracted neck, *a* and *f*, upon each side thereof, one of which, *a*, is provided with a thread cut inside, figs. 1, 2, and 7, or upon the outside, figs. 3 and 4, for attaching the same to a gas-fitting pipe or standard; or with a corrugated surface, as seen in fig. 5, for attaching hydrant-hose, by winding with cord or wire.

The reverse end *f* is of a larger diameter generally, to receive the lower portion of a gas-burner, fig. 2, and to provide for a socket-piece, or nipple, J, figs. 3, 4, and 5, of the same diameter of bore with the socket-neck *a*.

This nipple has a bulb, or swelling, *j*, figs. 4 and 5, against which the inwardly-projecting sides of the cushion press or expand from behind, to prevent the said nipple from being easily or accidentally withdrawn.

To this nipple is attached a flexible tube, *m*, or hose, in the manner hereinbefore mentioned.

The cushion D is formed within the swelling portion of the shell, to the inner walls of which it adheres firmly, to prevent any escape of gas or water upon the outside of the cushion, and upon the inside said cushion is moulded to a suitable form, to receive a nipple or a gas-burner, and is rendered elastic by the process of "vulcanizing," at the same time it is moulded, whereby the opening through the said cushion expands to receive a nipple or tube of a greater diameter, or to admit a tapering gas-burner, and contracts and embraces the same with sufficient force to form an air-tight joint with the outer surface of such nipple, or burner.

This cushion is formed within the shell, as above described, by the following process:

A piece of soft gum, of the size shown in fig. 10, No. 1, is formed into a cylinder, Nos. 2 and 3, by cementing. This is placed within the shell, as shown in fig. 8, through which passes a hollow mandrel, *d*, from the end *a*, the upper end of which enters the plunger *h*, which slides, with a close fit, into the end *f* of the shell.

The mandrel is turned smaller within the swelling portion to impart the proper form to the sides of the opening through the cushion, and the lower end of the plunger is turned in a conical form, to give shape to the entrance of the opening in the cushion.

These surfaces, which mould the said opening in the cushion, may be wrought in various forms, to produce a greater or less bearing-surface upon the cushion, or to form a corrugated surface, or a number of projecting rings or ridges, always providing for the withdrawal of the mandrel, by the yielding of the surface it has formed in the cushion.

The mandrel *d* is attached, by a thread, to a cock, I, upon a steam-pipe, *i*, upon the bed-piece, or table B, of a lever-press.

Resting upon said cock is a steam-chest, L, fig. 9, of cast-iron or brass, in the centre of which is formed a deep, cup-shaped cavity, for the reception of the shell G.

The plunger *h* is secured in the sliding plunger H of the press, and is acted upon, to cause it to descend, by a lever, operated by the hand or foot.

In the operation of forming the cushion, the mandrel and plunger in fig. 9 are put in the position shown in fig. 8, with a cylinder of gum, 2, surrounding the mandrel.

When steam of from seventy-five to one hundred pounds' pressure is admitted to the mandrel by cock I, the plunger *h* is then forced down, and, at the same time, steam is admitted to the steam-chest L.

The heat from steam thus applied acts to fuse the gum, and causes it to assume the form of the surfaces which encompass it.

Steam is then shut off from the chest L, and the socket-shell permitted to cool gradually, which operation causes the gum to adhere firmly to the inner walls of the shell, while the continued heat from the mandrel "vulcanizes" the gum immediately surrounding the same, and from thence penetrates outwardly toward the shell, but not to the entire thickness of the gum, which would cause the cushion to separate from the walls of the shell.

The gum should be subjected to the action of heat from three to five minutes, according to the temperature. When cock I is turned, shutting off the steam, plunger *h* is raised and withdrawn, and the shell is removed from the cavity in the steam-chest, and another shell supplies its place, to be operated upon in a similar manner; or, in lieu of the process just set forth, a solid plunger may be used, and the sockets having been acted upon by the same, may be placed in a steam-chest, and the rubber then vulcanized.

By vulcanizing the cushion from the centre with a heated mandrel, the surface of the opening through the same is rendered more elastic than any other portion thereof, which gives a greater range of expansion and contraction to said surface, and thus provides for the admission of tubes or burners of different or varying sizes.

Said surface also, from being subjected longer to the intense heat, is never softened by contact with a gas-burner which has been heated by the burning gas, which is very desirable in its use for drop-lights, so called, upon chandeliers.

The principal feature of the invention is found in the fact, that the shell being made of one entire piece of metal, all liability of the same to leak when in use (which is of common occurrence in the case of sockets made in the ordinary manner, or in which the projecting necks are secured to the body of the socket, by being screwed upon the same,) is avoided.

Again, by making the shell in one entire piece of metal, cheapness of manufacture is secured, in addition to the durability and effectiveness of the article.

The formation of the cavity to receive the packing is also a desirable feature, serving, as it does, to retain the caoutchouc or like gum in position, and thus adding greatly to the value of the article in question.

This cushion, to be effective, must adhere firmly to the shell, otherwise the gas or water will escape between it and the shell, and thus become inoperative and worthless for the purpose.

I am aware that caoutchouc has been applied in a variety of ways for this purpose, by inserting thick rings of tubing or disks of thin rubber, secured within the socket, between two surfaces, which are united by threads or screws, but such sockets have objections which are overcome by my invention.

Having thus described my invention, and the method of producing the same, I would not be understood as claiming broadly the application of a cushion of caoutchouc, or other elastic substance, within a metallic shell, for forming a joint with a metallic pipe, tube, or a gas-burner, as this has been done before; neither do I claim the application of heat to caoutchouc, for the purpose of rendering the same elastic, as this has been previously patented.

I do not claim an elastic plug of India rubber, nor such a plug encased in a metallic shield, as and for the purpose described in the patents of Albert Fuller, of October 16, 1855, and of August 30, 1859, respectively.

I claim—

1. A socket, provided with a recess, fitted with an elastic packing, substantially as and for the purposes specified.

2. A socket-coupling, having a hollow cylindrical cushion of caoutchouc, or other similar gum, adhering to the inner walls of the socket-shell, and having the surface of the opening through the same moulded in the desired form by compression, and made elastic by the action of heat applied thereto, in the manner and for the purpose substantially as herein specified.

3. In combination with such a cushion, a socket-piece, or nipple, having a bulb, or swelling ridge upon the end, which passes through the opening in said cushion, by the contraction of which opening the nipple is held securely within the socket, as set forth.

ELLIOTT P. GLEASON.

Witnesses:
J. C. GRANGER,
A. SIDNEY DOANE.